(12) United States Patent
Yoo

(10) Patent No.: US 7,636,587 B2
(45) Date of Patent: Dec. 22, 2009

(54) METHOD FOR DISPLAYING TASK EXECUTED ON MOBILE COMMUNICATION TERMINAL

(75) Inventor: Jun-Hyun Yoo, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 289 days.

(21) Appl. No.: 11/548,677

(22) Filed: Oct. 11, 2006

(65) Prior Publication Data

US 2007/0197175 A1 Aug. 23, 2007

(30) Foreign Application Priority Data

Oct. 11, 2005 (KR) ............... 10-2005-0095728

(51) Int. Cl.
*H04M 1/00* (2006.01)
*H04B 1/38* (2006.01)

(52) U.S. Cl. .......................... 455/566; 455/550.1
(58) Field of Classification Search ......... 455/566, 455/550.1
See application file for complete search history.

(56) References Cited

U.S. PATENT DOCUMENTS

| | | | | |
|---|---|---|---|---|
| 6,304,763 | B1 * | 10/2001 | Jahagirdar et al. | 455/566 |
| 6,389,447 | B1 * | 5/2002 | Singh | 718/100 |
| 7,016,703 | B2 * | 3/2006 | Kishimoto et al. | 455/566 |
| 7,103,387 | B2 * | 9/2006 | Seo | 455/566 |
| 7,123,945 | B2 * | 10/2006 | Kokubo | 455/566 |
| 7,187,951 | B2 * | 3/2007 | Kaida | 455/566 |
| 7,289,772 | B1 * | 10/2007 | Bonansea et al. | 455/73 |
| 7,400,902 | B2 * | 7/2008 | Jeon | 455/550.1 |
| 7,460,893 | B2 * | 12/2008 | Aarras | 455/575.3 |
| 2001/0011029 | A1 * | 8/2001 | Iwabuchi et al. | 455/566 |
| 2001/0016508 | A1 * | 8/2001 | Kido et al. | 455/575 |
| 2002/0037754 | A1 * | 3/2002 | Hama et al. | 455/566 |
| 2002/0039915 | A1 * | 4/2002 | Hama et al. | 455/566 |
| 2002/0077156 | A1 * | 6/2002 | Smethers | 455/566 |
| 2002/0094826 | A1 * | 7/2002 | Lee | 455/457 |
| 2003/0013483 | A1 * | 1/2003 | Ausems et al. | 455/556 |
| 2003/0045315 | A1 * | 3/2003 | Vasa | 455/517 |
| 2003/0119562 | A1 * | 6/2003 | Kokubo | 455/566 |
| 2003/0232628 | A1 * | 12/2003 | Fehrm | 455/550.1 |
| 2004/0014488 | A1 * | 1/2004 | Sawayama et al. | 455/550.1 |
| 2004/0192401 | A1 * | 9/2004 | Kaida | 455/566 |
| 2004/0203902 | A1 * | 10/2004 | Wilson et al. | 455/456.1 |
| 2004/0214610 | A1 * | 10/2004 | Tanemura et al. | 455/566 |
| 2005/0083642 | A1 * | 4/2005 | Senpuku et al. | 361/681 |
| 2006/0099938 | A1 * | 5/2006 | Lee | 455/418 |
| 2006/0264243 | A1 * | 11/2006 | Aarras | 455/566 |
| 2006/0293088 | A1 * | 12/2006 | Kokubo | 455/566 |

* cited by examiner

*Primary Examiner*—Lester Kincaid
*Assistant Examiner*—Nathan Mitchell
(74) *Attorney, Agent, or Firm*—Lee, Hong, Degerman, Kang & Waimey

(57) ABSTRACT

The present invention is related to a mobile communication terminal capable of displaying a task executed thereon. The mobile communication terminal includes a first display for initially displaying one or more tasks simultaneously being executed on the mobile communication terminal, a second display for subsequently displaying the one or more tasks simultaneously being executed on the mobile communication terminal after a display conversion from the first display to the second display occurs, and a controller operationally connected with the first display and the second display, wherein the controller displays on the second display a highest priority task among the one more tasks simultaneously being executed when the display conversion from the first display to the second display occurs.

21 Claims, 14 Drawing Sheets

METHOD FOR DISPLAYING TASK EXECUTED ON MOBILE COMMUNICATION TERMINAL

CROSS-REFERENCE TO RELATED APPLICATIONS

Pursuant to 35 U.S.C. § 119(a), this application claims the benefit of earlier filing date and right of priority to Korean Application No. 10-2005-0095728, filed on Oct. 11, 2005, the contents of which are hereby incorporated by reference herein in their entirety.

FIELD OF THE INVENTION

The present invention relates to a method for displaying a task executed on a mobile communication terminal, and more particularly, to a method for displaying a specific task on a specific display of a multi-display mobile communication terminal capable of simultaneously executing a plurality of tasks.

BACKGROUND OF THE INVENTION

Previously, a related art mobile communication terminal could not simultaneously execute several certain tasks (i.e. perform multitasking) due to technical problems. For example, the related art mobile communication terminal could not utilize an Internet service to download a program during a call. Moreover, the related art mobile communication terminal could not play a game on a screen during a call while using an earphone. Accordingly, the related art mobile communication terminal only displayed on a screen an operation (service) currently used by a user.

However, a recent mobile communication terminal has been developed such that all services provided thereon can be simultaneously operated. Thus, when a user wishes to execute a multitasking function, all tasks in operation must be displayed. Accordingly, a mobile communication terminal for supporting the multitasking function has been presented.

However, the related art mobile communication terminal for supporting the multitasking function has many problems. Specifically, when a display conversion is executed from a first display to a second display, such as during a closing operation of a folder type mobile communication terminal, under a state that part or all of the tasks being executed are displayed on the first display of the mobile communication terminal, the tasks displayed on the first display are not completed. Furthermore, when a display conversion from the second display to the first display is executed, such as during an opening operation of a folder type mobile communication terminal, the tasks previously displayed on the first display prior to the display conversion are not re-displayed on the first display. Accordingly, the user has to re-execute the tasks previously displayed.

SUMMARY OF THE INVENTION

The present invention is directed to a mobile communication terminal capable of displaying a task executed thereon.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile communication terminal capable of displaying a task executed thereon, the mobile communication terminal comprising a first display for initially displaying one or more tasks simultaneously being executed on the mobile communication terminal, a second display for subsequently displaying the one or more tasks simultaneously being executed on the mobile communication terminal after a display conversion from the first display to the second display occurs, and a controller operationally connected with the first display and the second display, wherein the controller displays on the second display a highest priority task among the one more tasks simultaneously being executed when the display conversion from the first display to the second display occurs.

Preferably, the highest priority task is a task related to a communication function. Alternatively, the highest priority task is a task related to a sound output function.

Preferably, when the highest priority task is not a Latest Recently Used (LRU) task, the controller changes the highest priority task into an LRU task and displays the changed task on the second display. Furthermore, when the highest priority task does not exist, the controller displays a default task.

Preferably, when the highest priority task is finished executing after the display conversion, the controller displays a next highest priority task among the one more tasks simultaneously being executed.

Preferably, the display conversion from the first display to the second display corresponds to a closing operation of a folder type mobile communication terminal. Moreover, a list of the one or more tasks can be displayed on the second display.

Preferably, during a display return from the second display to the first display, the controller re-displays on the first display a task that was displayed on the first display prior to the occurrence of the display conversion. Preferably, the display return from the second display to the first display corresponds to an opening operation of a folder type mobile communication terminal.

In accordance with another embodiment of the present invention, a method for displaying a task executed on a mobile communication terminal comprises initially displaying one or more tasks simultaneously being executed on the mobile communication terminal on a first display, receiving a command for a display conversion from the first display to a second display, and displaying on the second display a highest priority task among the one more tasks simultaneously being executed in response to the command for the display conversion.

Preferably, the displaying step comprises comparing priorities of the one or more tasks with each other when receiving the command, and determining the highest priority task based on the comparison. Preferably, the highest priority task is a task related to a communication function. Alternatively, the highest priority task is a task related to a sound output function.

Preferably, the displaying step comprises changing the highest priority task into a Latest Recently Used (LRU) task if the highest priority task is not the LRU task. Furthermore, a default task is displayed if the highest priority task does not exist.

In one aspect of the invention, the method further comprises finishing the highest priority task and displaying a next highest priority task on the second display if a command to finish the highest priority task is received after the displaying step. Preferably, the display conversion from the first display to the second display corresponds to a closing operation of a folder type mobile communication terminal. Moreover, a list of the one or more tasks can be displayed on the second display.

In another aspect of the invention, the method further comprises displaying a specific task on the first display if a command for a display return from the second display to the first display is received, wherein the specific task was a Latest Recently Used (LRU) task prior to the display conversion.

Preferably, the display return from the second display to the first display corresponds to an opening operation of a folder type mobile communication terminal. Furthermore, during the display return, the one or more tasks have the same execution order as the execution order prior to the display conversion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The terms used in the present invention will be explained. The term "Priority" in the present invention refers to a priority of a task to be displayed on a second display. The priority may comprise of numbers of an ascending order or a descending order. The priority may be set to a plurality of tasks, or to a part of the plurality of tasks. The priority may be preset in a mobile communication terminal, or may be set by a user according to each task. For instance, a high priority task may be a task relevant to communication, a camera, an audio player, and a video player. However, the high priority task is not limited to the above tasks. Also, the term "Default" refers to a task to be displayed on the second display when no task having priority exists. The default task may be implemented in plurality, such as a clock or a calendar.

Figure 1:
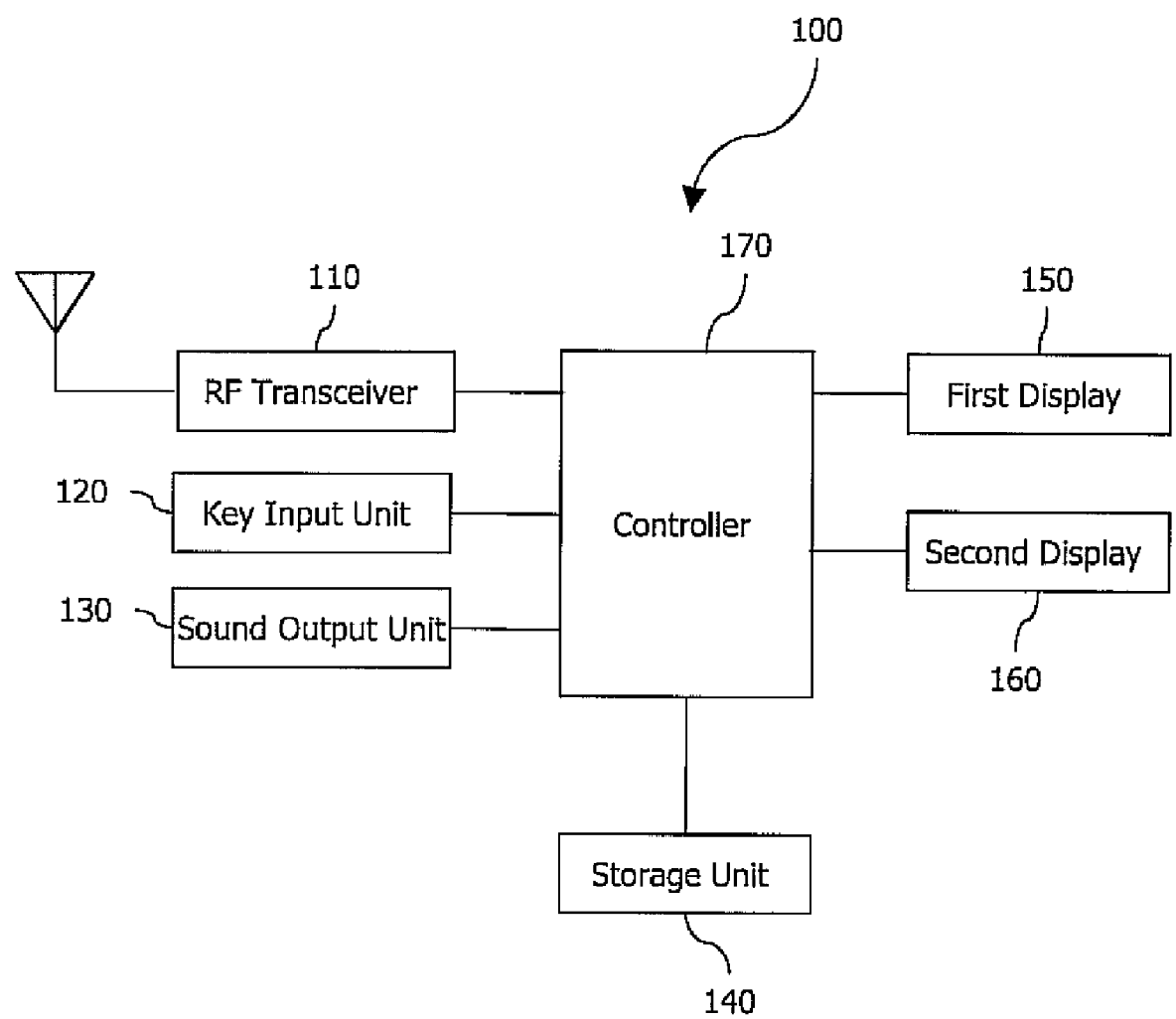
FIG. 1 is a block diagram showing a mobile communication terminal according to a first embodiment of the present invention.

Hereinafter, a preferred embodiment of the present invention will be explained with reference to the attached drawings. FIG. 1 is a block diagram showing a mobile communication terminal according to a first embodiment of the present invention.

Referring to FIG. 1, a mobile communication terminal 100 according to a first embodiment of the present invention comprises an RF transceiver 110, a key input unit 120, a sound output unit 130, a storage unit 140, a first display 150, a second display 160, and a controller 170.

The RF transceiver 110 may comprise of electronic components for electric wave transmission and reception. Preferably, the RF transceiver 110 may comprise of electronic components for supporting CDMA, GSM, GPRS, TDMA, IMT-2000, WCDMA, and HSDPA-based communication, for example. The RF transceiver 110 is controlled by the controller 170 to transmit and receive a signal.

The key input unit 120 may comprise of a key button for inputting a signal by a user, and a touch pad inside the first display 150 and/or the second display 160. The key input unit 120 is operationally connected to the controller 170 to be controlled.

The sound output unit 130 is electrically connected to the controller 170 to be controlled. The sound output unit 130 outputs sound generated by several functions of the mobile communication terminal 100.

The storage unit 140 may comprise of a flash memory, a nand flash memory, an optical drive or a hard disc. The storage unit 140 stores one or more function modules, i.e., tasks that can be executed by the controller 170. The function modules may be a communication module, a camera module, an audio player module, a video player module, etc. However, the function modules are not limited to the above tasks.

The first display 150 and the second display 160 may be implemented as a Liquid Crystal Display (LCD) or with Organic Light Emitting Diodes (OLED). The first display 150 and the second display 160 are electrically connected to the controller 170 and display screens according to each function of the mobile communication terminal 100.

The controller 170 comprises a plurality of semiconductor devices, and is electrically connected to the RF transceiver 110, the key input unit 120, the sound output unit 130, the storage unit 140, the first display 150, and the second display 160.

Preferably, when one or more tasks are being executed at the mobile communication terminal 100, the controller 170 controls a highest priority task among the one or more tasks to be displayed on the second display 160 during a display conversion from the first display 150 to the second display 160. The highest priority task may be a communication function task or a sound output function task. When the highest priority task is not a Latest Recently Used (LRU) task, the controller 170 changes the highest priority task into a top layer task and displays the task on the second display. When there is more than one highest priority task, the controller 170 displays the task among the plurality of highest priority tasks having a higher execution order level prior to the display conversion. During a display return from the second display 160 to the first display 150, the controller 170 may display on the first display 150 the task having been displayed on the first display 150 prior to the display conversion. Furthermore, during the display return, the one or more tasks may have the same execution order as the execution order prior to the display conversion.

During the return to the first display 150 from the second display 160 and after completing a part of the one or more tasks, the controller 170 may display an LRU task rather than the completed task on the first display 150.

So far, the construction of the mobile communication terminal 100 has been explained. Hereinafter, an operation of the controller 170 for displaying a task on a display during a display conversion from the first display 150 to the second display 160, and an operation of the controller 170 during a display return from the second display 160 to the first display 150 will be explained.

Figure 2:
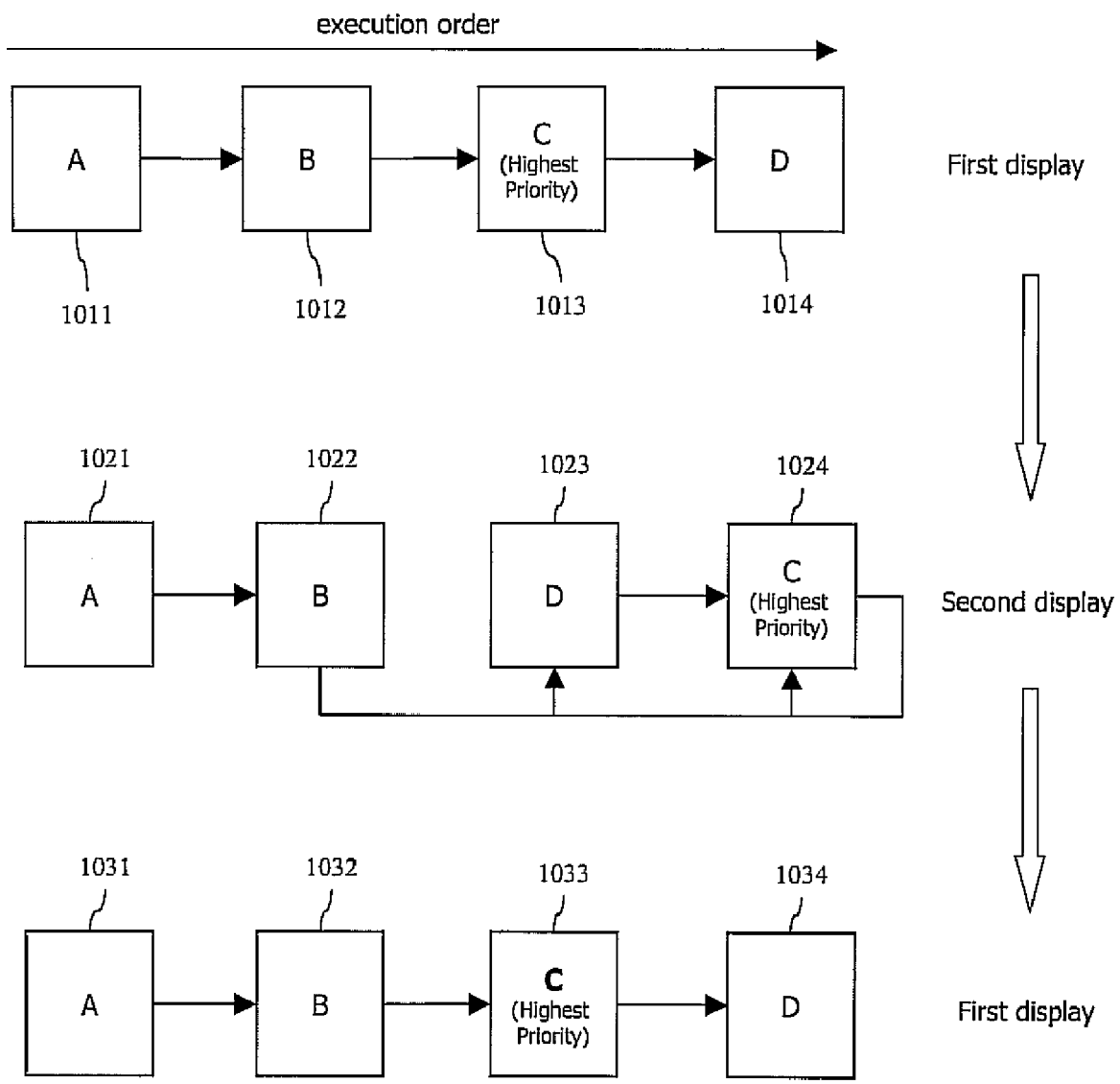
FIG. 2 is an exemplary view schematically showing tasks displayed on a first display and a second display of the mobile communication terminal in accordance with one embodiment of the present invention.

FIG. 2 is an exemplary view schematically showing tasks displayed on a first display and a second display of the mobile communication terminal in accordance with one embodiment of the present invention. As shown in FIG. 2, when a display conversion from the first display 150 to the second display 160 is executed, such as during a closing operation of a folder type mobile communication terminal, the controller 170 may display a certain task on the second display 160. Also, when a display return from the second display 160 to the first display 150 is executed, such as during an opening operation of the folder type mobile communication terminal, the controller 170 may display a certain task on the first display 150 that was displayed before the display conversion was executed, wherein the certain task is in the same execution order as the execution order prior to the display conversion.

Referring to FIG. 2, an execution order of a plurality of tasks will be explained. First, the controller 170 sequentially executes a task 'A' 1011, a task 'B' 1012, and a task 'C' 1013 by an external request. The task 'C' 1013 is a high priority task such as a communication function task, e.g., a calling task, a VOD task, an AOD task, etc. Finally, the controller 170 executes a task of 'D' 1014. Since a Latest Recently Used (LRU) task is displayed on a display during multitasking, the task 'D' 1014 is displayed on the first display 150.

When a display conversion from the first display 150 to the second display 160 is requested externally, such as during a closing operation of a folder type mobile communication terminal, the controller 170 displays the highest priority task. Thus, the task 'C' 1024 is displayed on the second display 160. Herein, other tasks not displayed on the second display 160 have not ended, but are still being executed (1021~1023).

When a display return from the second display 160 to the first display 150 is requested externally, such as during an opening operation of the folder type mobile communication terminal, the controller 170 displays the task 'D' 1034 on the first display 150, which had been displayed on the first display 150 prior to the conversion. Herein, other tasks not displayed on the first display 150 have the same execution order as the order prior to the conversion (1031~1033).

Figure 3:
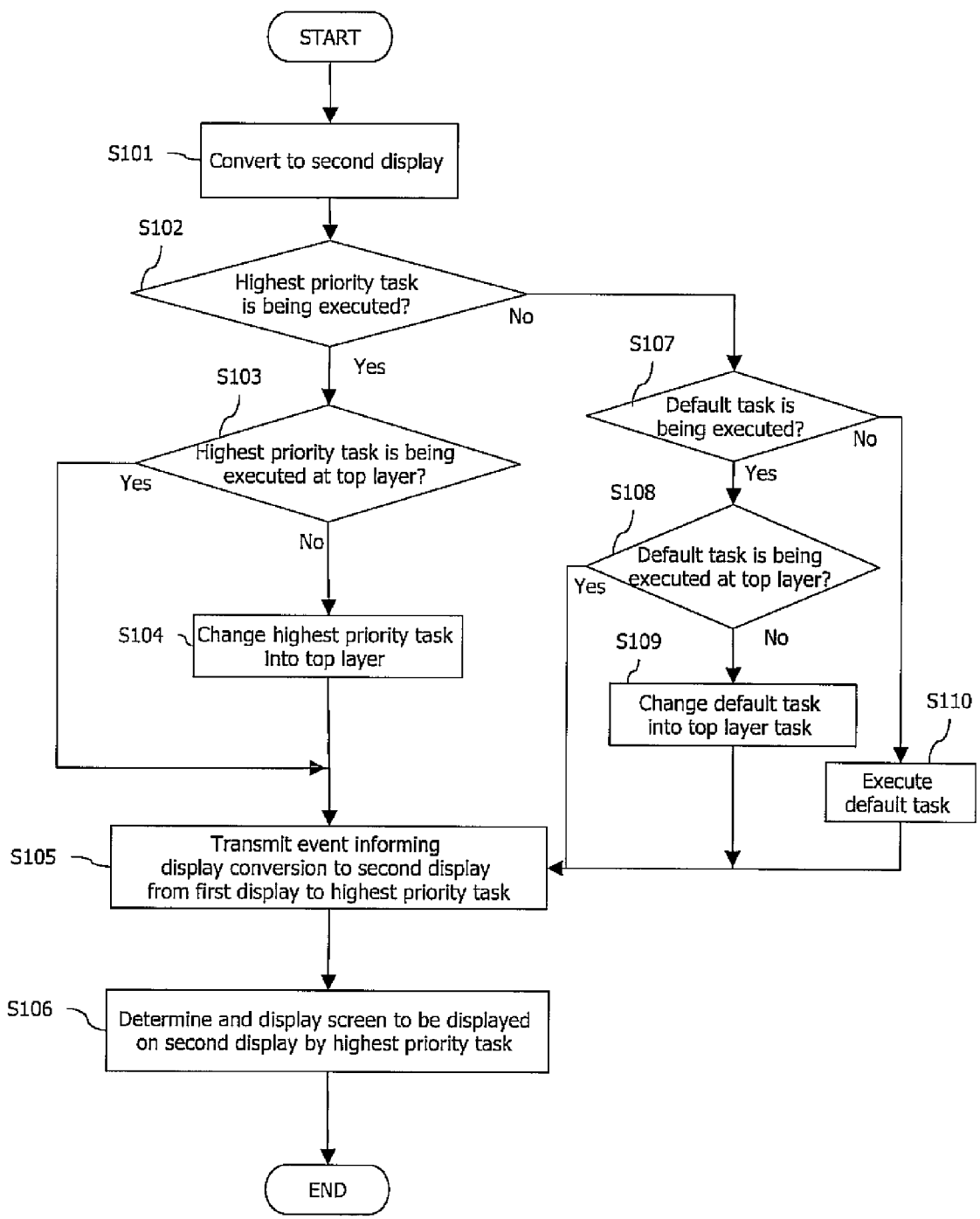
FIG. 3 is a flowchart showing a method for displaying a specific task on a second display during a display conversion from a first display to the second display according to a second embodiment of the present invention.

FIG. 3 is a flowchart showing a method for displaying a specific task on a second display during a display conversion from a first display to the second display according to a second embodiment of the present invention. As shown, a request for a display conversion from the first display to the second display is received from a user (S101). Then, it is determined whether a highest priority task to be displayed on the second display is being executed (S102).

If it is determined that the highest priority task is being executed, it is then determined whether the highest priority task is a top layer task, i.e., a Latest Recently Used (LRU) task (S103). If the highest priority task is not a top layer task, the highest priority task is changed into a top layer task (S104). However, if it is determined that the highest priority task is a top layer task, an event for informing a display conversion from the first display to the second display is transmitted to the highest priority task (S105). Thereafter, the highest priority task responds to the event, determines a screen to be displayed on the second display, and displays the screen (S106).

If it is determined that the highest priority task is not being executed (S102), it is then determined whether a default task is being executed (S107). If it is determined that the default task is being executed (S107), then it is determined whether the default task is a top layer task (S108). If it is determined that the default task is not a top layer task (S08), the default task is then changed into a top layer task (S109). However, if it is determined that the default task is a top layer task (S108), the process moves to the step S105. Moreover, if it is determined that the default task is not being executed (S107), then the default task is executed (S110), and the process moves to the step S105.

So far, a display conversion from the first display to the second display while a plurality of tasks are being executed has been explained. Hereinafter, a command for finishing a certain task inputted by a user during the display conversion from the first display to the second display will be explained.

Figure 4:
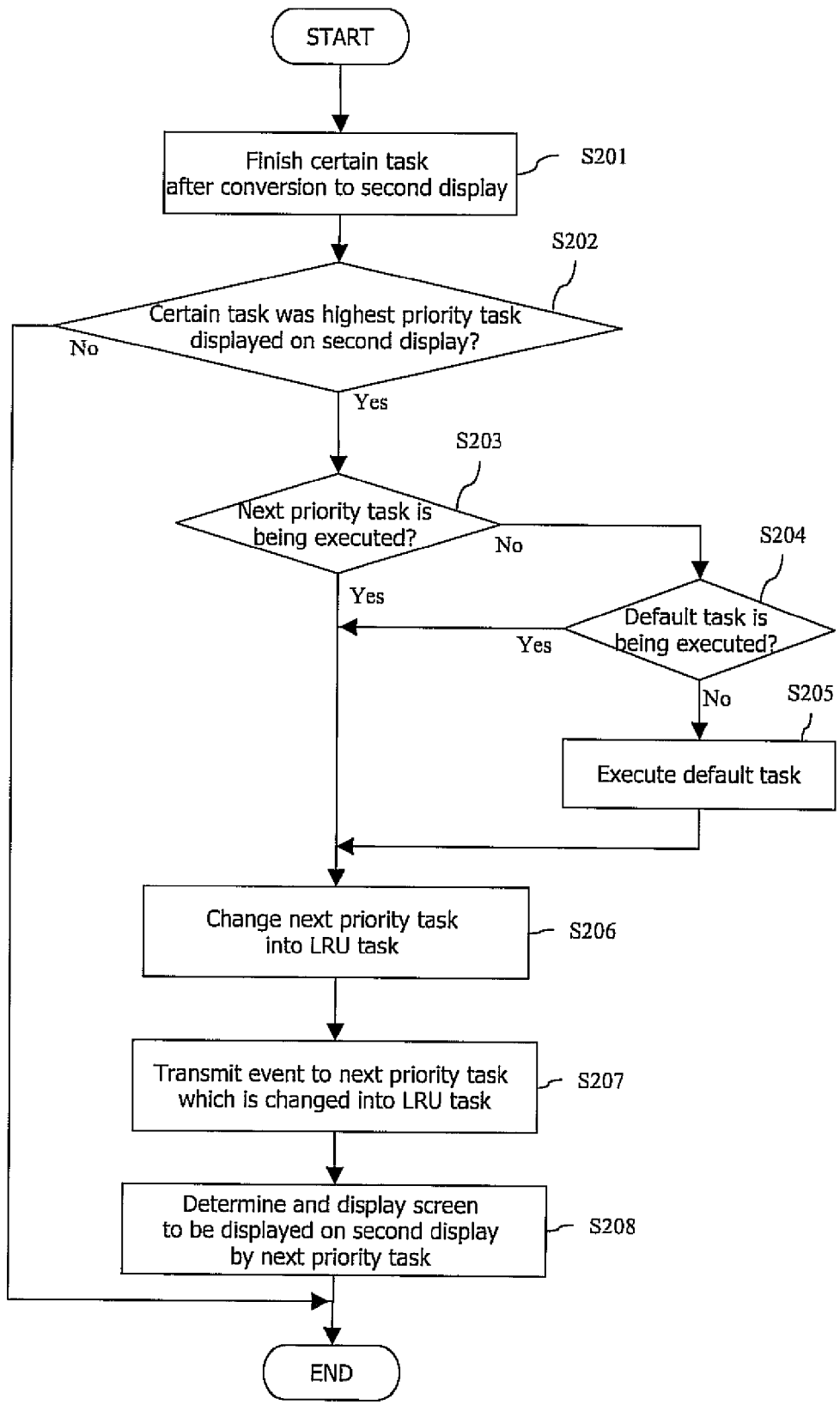
FIG. 4 is a flowchart showing a method for displaying a specific task on the second display according to a third embodiment of the present invention.

FIG. 4 is a flowchart showing a method for displaying a specific task on the second display according to a third embodiment of the present invention. As shown, a command to finish a certain task is inputted by a user (S201). It is then determined whether the certain task is a task to be displayed on the second display, i.e., a highest priority task (S202). If the certain task is not a task to be displayed on the second display, i.e., a highest priority task, the certain task is ended and the process is finished.

However, if the certain task is a task to be displayed on the second display, it is determined whether a next highest priority task is being executed (S203). If the next highest priority task is not being executed, it is then determined whether a default task is being executed (S204). If the default task is not being executed, the default task is then executed (S205).

Afterward, the next highest priority task or the default task is changed into a top layer task (S206), and an event is transmitted to the changed task (S207). Finally, the task having received the event determines a screen to be displayed, and displays the determined screen on the second display (S208).

Figure 5:
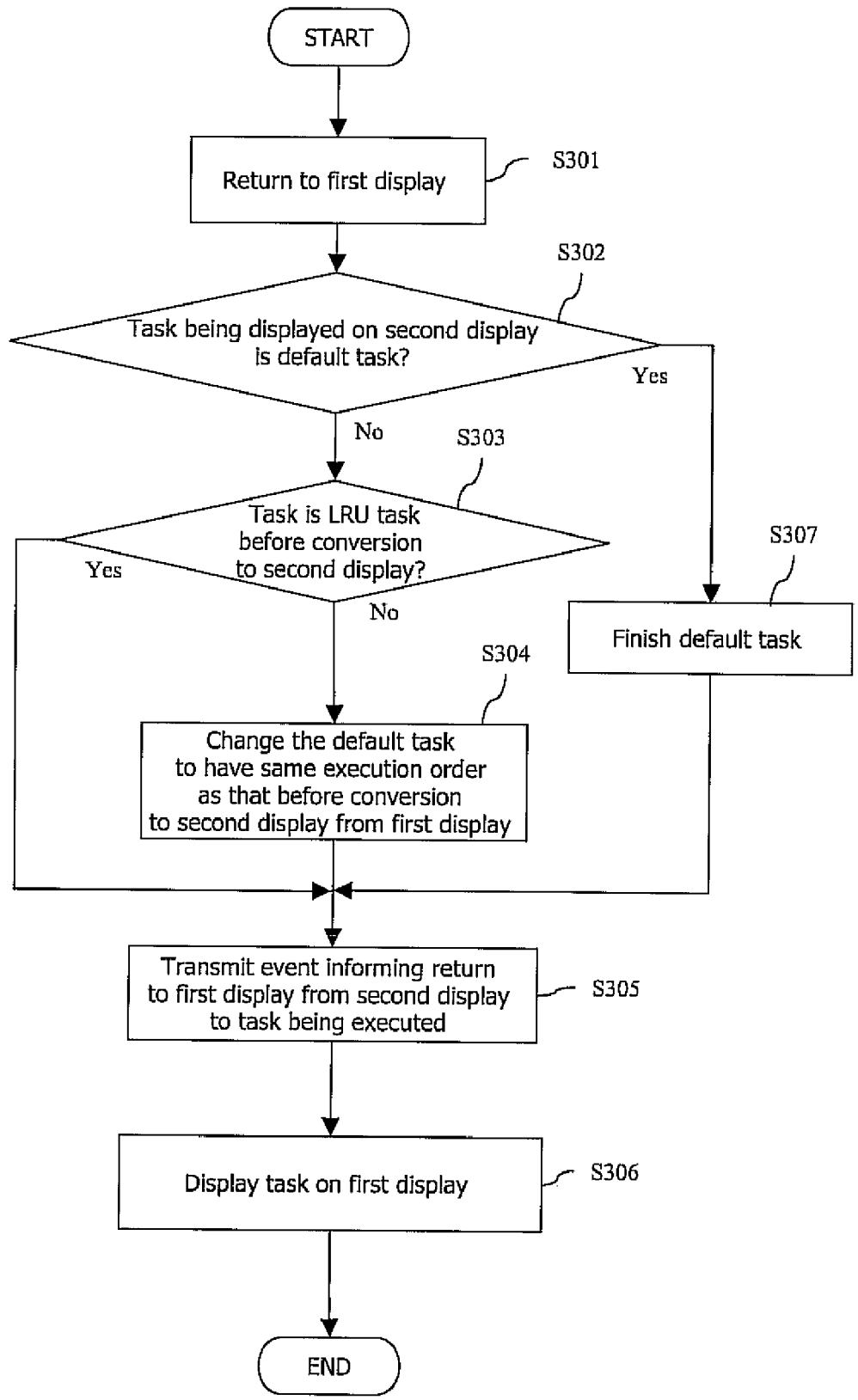
FIG. 5 is a flowchart showing a method for displaying a specific task on the first display during a display return from the second display to the first display according to a fourth embodiment of the present invention.

FIG. 5 is a flowchart showing a method for displaying a specific task on the first display during a display return from the second display to the first display according to a fourth embodiment of the present invention. As shown, a command for a display return from the second display to the first display is inputted by a user (S301). Afterward, it is determined whether a task displayed on the second display is a default task (S302). If it is determined that the task displayed on the second display is a default task, the default task is then finished (S307) and a top layer task prior to a conversion to the second display from the first display is re-displayed on the first display.

However, if it is determined that the task displayed on the second display is not a default task, it is then determined whether the task displayed on the second display is the Latest Recently Used (LRU) task prior to the conversion to the second display from the first display (S303). If it is determined that the task displayed on the second display is the LRU task, an event for informing a return to the first display from the second display is transmitted to the task (S305). The task then determines a screen to be displayed on the first display and displays the screen (S306).

However, if it is determined that the task displayed on the second display is not the LRU task, the task is changed to have the same execution order prior to the conversion to the second display from the first display (S304). Afterward, an event is transmitted to the changed task for informing the return from the second display to the first display (S305). The changed task having received the event then determines a screen to be displayed on the first display, and displays the screen (S306).

So far, the display conversion from the first display to the second display and the display return from the second display to the first display have been explained. Hereinafter, further aspects of the above-described inventions will be explained.

Figure 6:
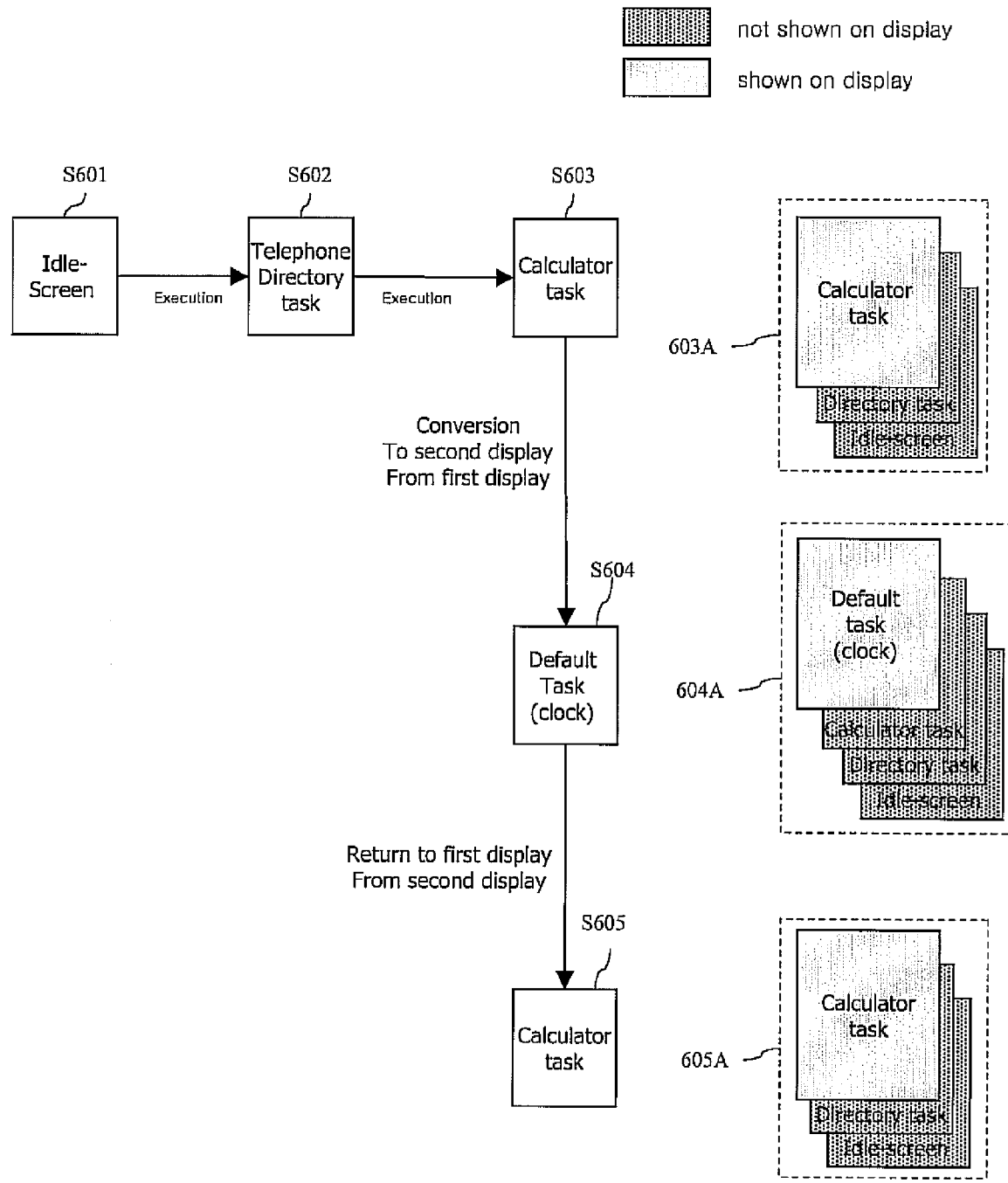
FIG. 6 is a first exemplary view showing the methods of FIGS. 3 to 5.

FIG. 6 is a first exemplary view showing the methods of FIGS. 3 to 5. As shown, on an idle-screen (S601) a telephone directory task is executed (S602). Thereafter, a calculator task is executed thereon (S603). The task execution order is shown in 603A. Here, each priority of the idle-screen, the telephone directory, and the calculator is not set. When a display conversion from the first display to the second display is executed, a default task (e.g., a clock task) is executed (S604) because a highest priority task does not exist. Accordingly, the default task displays a suitable screen (e.g., a calling time) on the second display. Notably, the task execution order is shown in 604A.

During the return from the second display to the first display, the default task is finished. Thus, the task displayed on the first display before the display conversion, i.e., a calculator task is displayed (S605). Accordingly, the task execution order is shown in 605A.

Figure 7:
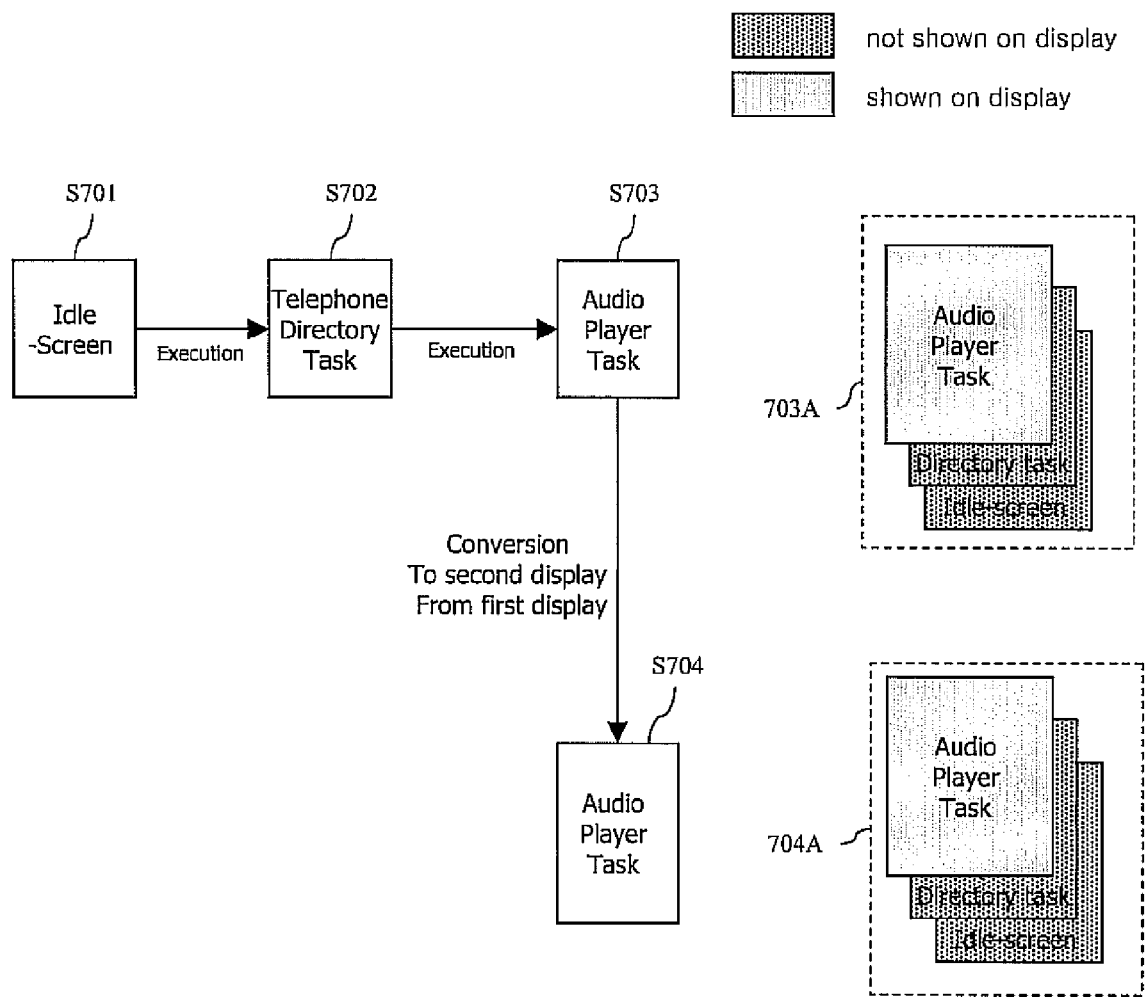
FIG. 7 is a second exemplary view showing the methods of FIGS. 3 to 5.

FIG. 7 is a second exemplary view showing the methods of FIGS. 3 to 5. As shown, an idle-screen is displayed (S701). Afterward, a telephone directory task (S702) and an audio player task (S703) are executed. The task execution order is shown in 703A. Here, a priority of the telephone directory task is not set. Moreover, the audio player task is a highest priority task. During a display conversion from the first display to the second display, the audio player task displays a suitable screen on the second display because the audio player task is the highest priority task (S704). This task execution order is shown in 704A. Herein, the suitable screen displayed on the second display may be equal to or different from the screen displayed on the first display.

Figure 8:
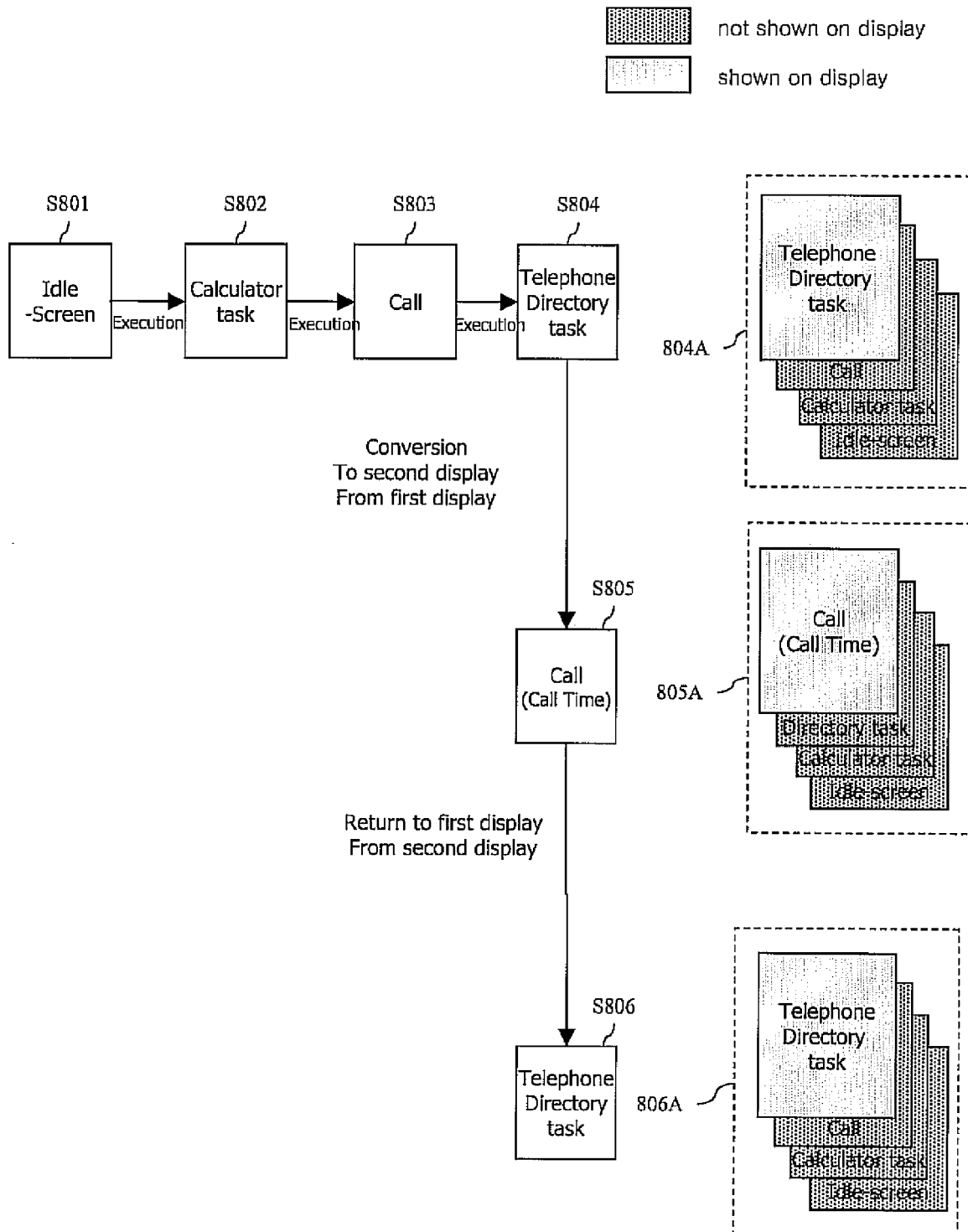
FIG. 8 is a third exemplary view showing the methods of FIGS. 3 to 5.

FIG. 8 is a third exemplary view showing the methods of FIGS. 3 to 5. As shown, an idle-screen is displayed (S801) and a calculator task is executed (S802). Afterward, a call (S803) and a telephone directory task (S804) are executed. The task execution order is shown in 804A. Here, each priority of the calculator task and the telephone directory task is not set, and the call is a highest priority task. During a display conversion from the first display to the second display, the call task is changed into a top layer task because the call task is the highest priority task. The call task then displays a suitable screen on the second display (S805). Notably, this task execution order is shown in 805A. The suitable screen may be a call time, another party's address, or a photo.

During a display return to the first display from the second display, the telephone directory task is changed into a top layer task. Accordingly, the telephone directory task is displayed on the first display (S806). As shown in 806A, a task execution order after the return to the first display from the second display is equal to the task execution order before the display conversion (804A).

Figure 9:
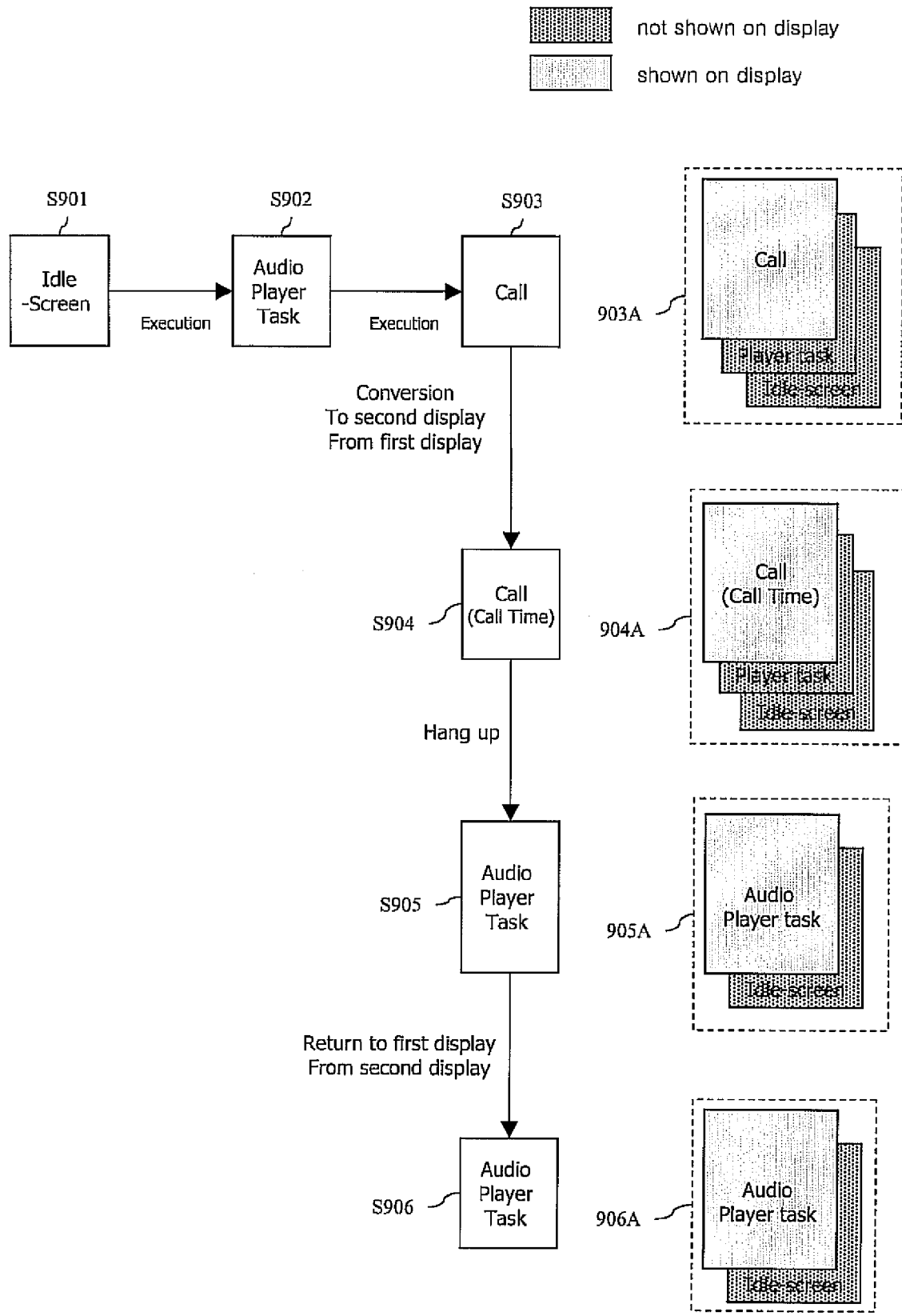
FIG. 9 is a fourth exemplary view showing the methods of FIGS. 3 to 5.

FIG. 9 is a fourth exemplary view showing the methods of FIGS. 3 to 5. As shown, an idle screen (S901) is displayed and an audio player task is executed (S902). Afterward, a call task is requested (S903). The task execution order is shown in 903A. Here, a priority of the call task may be higher than or equal to that of the audio player task. Hereinafter, each case will be explained separately.

If the priority of the call task is higher than that of the audio player task, when a display conversion from the first display to the second display is executed, the call task displays a suitable screen on the second display. If the priority of the call task is equal to that of the audio player task, when a display conversion from the first display to the second display is executed, the call task displays a suitable screen on the second display because the call task is a Last Recently Used (LRU) task (S904). This task execution order is shown in 904A.

When the call task is finished, the audio player task then displays a suitable screen on the second display (S905, 905A). Afterward, during a display return from the second display to the first display, the audio player task is displayed on the first display (S906, 906A).

Figure 10:
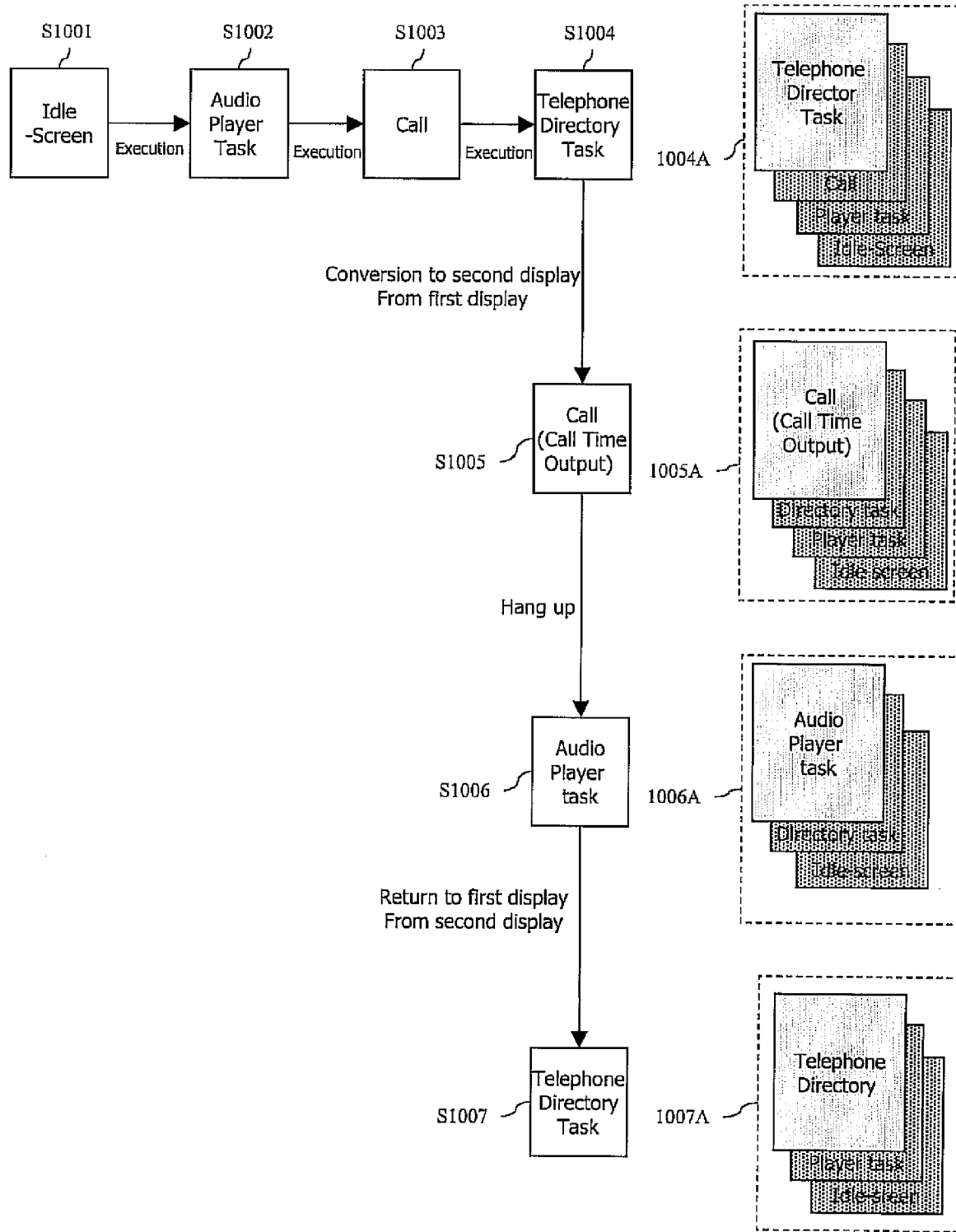
FIG. 10 is a fifth exemplary view showing the methods of FIGS. 3 to 5.

FIG. 10 is a fifth exemplary view showing the methods of FIGS. 3 to 5. As shown, an idle screen (S1001) is displayed and an audio player task is displayed (S1002). Then, a call task is requested (S1003). Afterward, a telephone directory task is requested and displayed (S1004). The task execution order is shown in 1004A. Here, each priority of the audio player task and the telephone directory is not set, and the call task is a highest priority task.

During a display conversion from the first display to the second display, the call task is changed into a top layer task because the calling task is the highest priority task. Accordingly, the call task displays a suitable screen on the second display (S1005). This task execution order is shown in 1005A.

Notably, when the call task is finished, a next highest priority task does not exist to be displayed. Therefore, a default task must be set and newly executed. Here, the audio player task is set as the default task. Accordingly, the default task displays a suitable screen on the second display (S1006). This task execution order is shown in 1006A.

Afterward, when a display return from the second display to the first display is performed, the telephone directory task is displayed (S1007) on the first display because the telephone directory task is the last task displayed prior to the display conversion from the first display to the second display. This task execution order is shown in 1007A.

Figure 11:
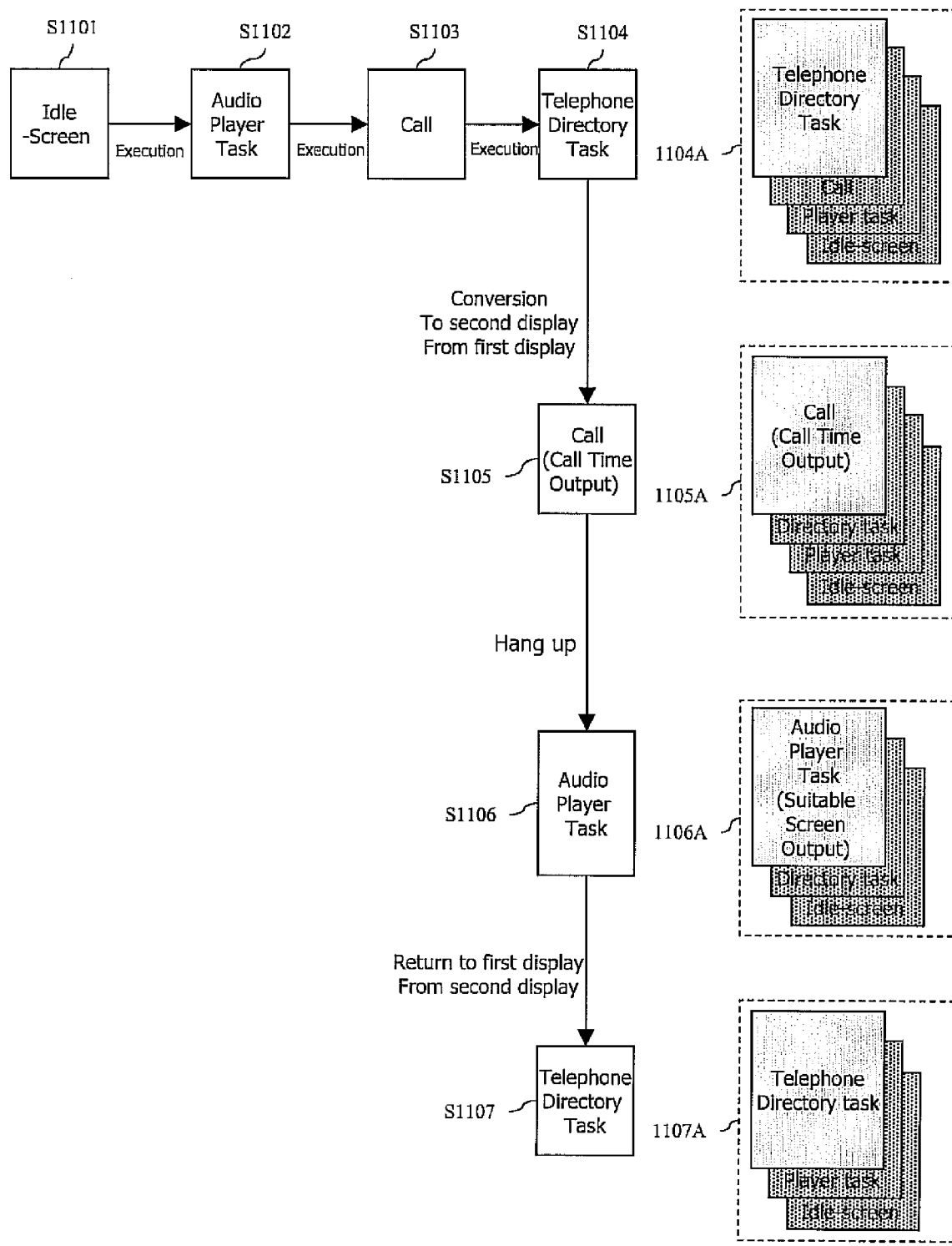
FIG. 11 is a sixth exemplary view showing the methods of FIGS. 3 to 5.

FIG. 11 is a sixth exemplary view showing the methods of FIGS. 3 to 5. As shown, an idle screen is displayed (S1101) and an audio player task is executed (S1102). Then, a call task is requested (S1103). Afterward, a telephone directory task is executed (S1104). The task execution order is shown in 1104A. Here, a priority of the telephone directory task is not set. A priority of the call task may be equal to or higher than that of the audio player task. Hereinafter, each case will be separately explained.

When a display conversion is executed from the first display to the second display, wherein the priority of the call task is higher than that of the audio player task, the call task is changed into a top layer task. Afterward, the call task displays a suitable screen on the second display (S1105). However, if the priority of the audio player task is equal to that of the call task, the call task still displays a suitable screen on the second display because it is an upper layer task (S1105). This task execution order is shown in 1105A.

When the call task is finished, the audio play task is changed into a top layer task because it has the next highest priority. Accordingly, the audio player task displays a suitable screen on the second display (S1106). This task execution order is shown in 1106A. During a display return from the second display to the first display, the priority of the audio player task is changed to comply with the same execution order as the execution order prior to the display conversion (107A). Accordingly, the telephone directory task, which was the Last Recently Used (LRU) task prior to the display conversion, is displayed on the first display (S1107).

Figure 12:
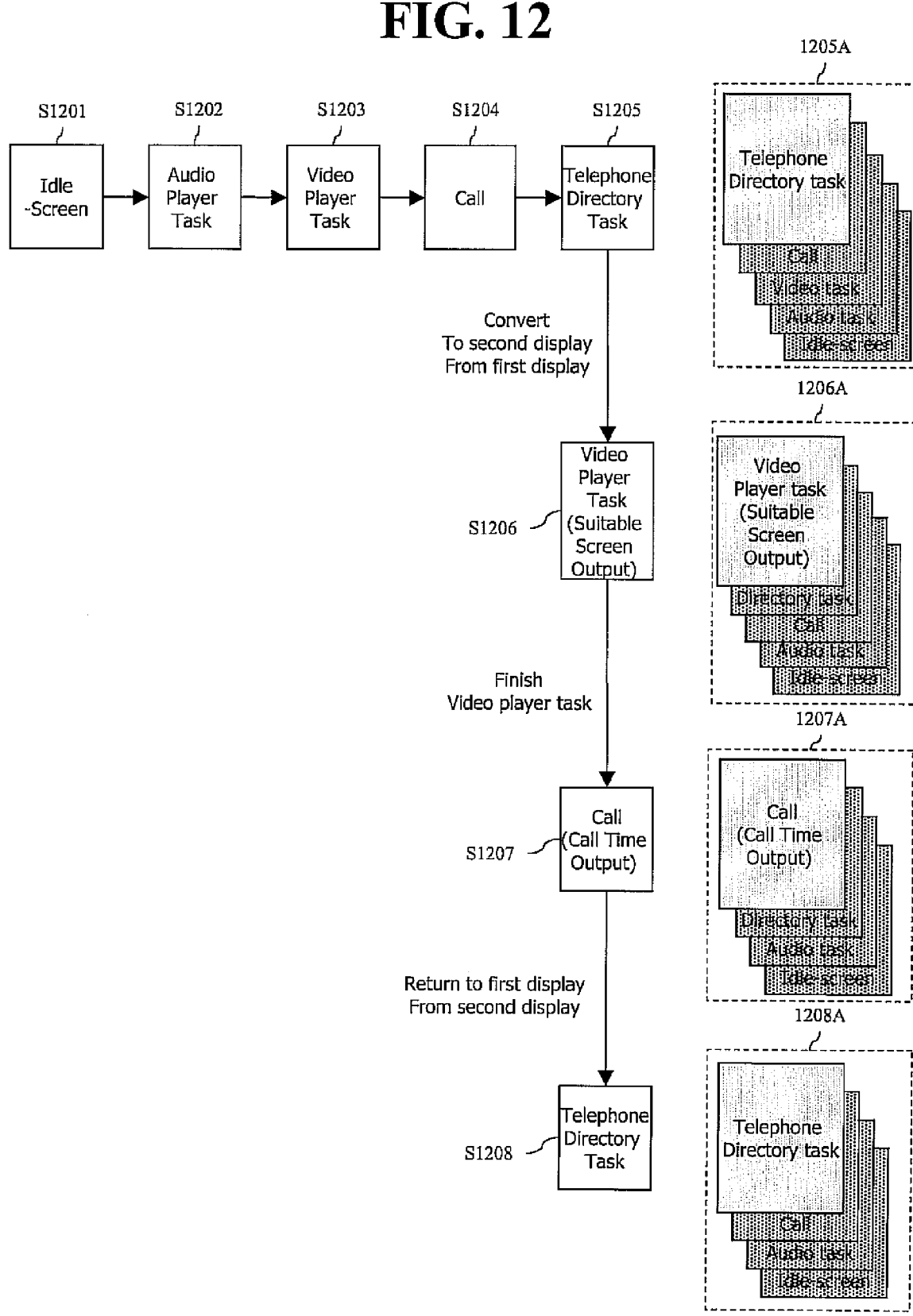
FIG. 12 is a seventh exemplary view showing the methods of FIGS. 3 to 5.

FIG. 12 is a seventh exemplary view showing the methods of FIGS. 3 to 5. As shown, an idle screen is displayed (S1201), an audio player task is executed (S1202) and a video player task is executed (S1203). Afterward, a call task is requested (S1204) and a telephone directory task is executed (S1205). The task execution order is shown in 1205A. Here, a priority of the telephone directory task is not set. Moreover, the video player task is a highest priority task, the call task is a next highest priority task, and the audio player task is a lowest priority task.

During a display conversion from the first display to the second display, the video player task is changed into a top layer task because it is the highest priority task. Accordingly, the video player task displays a suitable screen on the second display (S1206). The task execution order is shown in 1206A.

When the video player task is finished, the call task is changed into a top layer task because it is the next highest priority task. Accordingly, the call task then displays a suitable screen on the second display (S1207), as reflected in the task execution order 1207A.

Finally, during a display return from the second display to the first display, the priority of the call task is changed to comply with the same execution order as the execution order prior to the display conversion (1208A). Thus, the telephone directory task is re-displayed on the first display (S1208).

Figure 13:
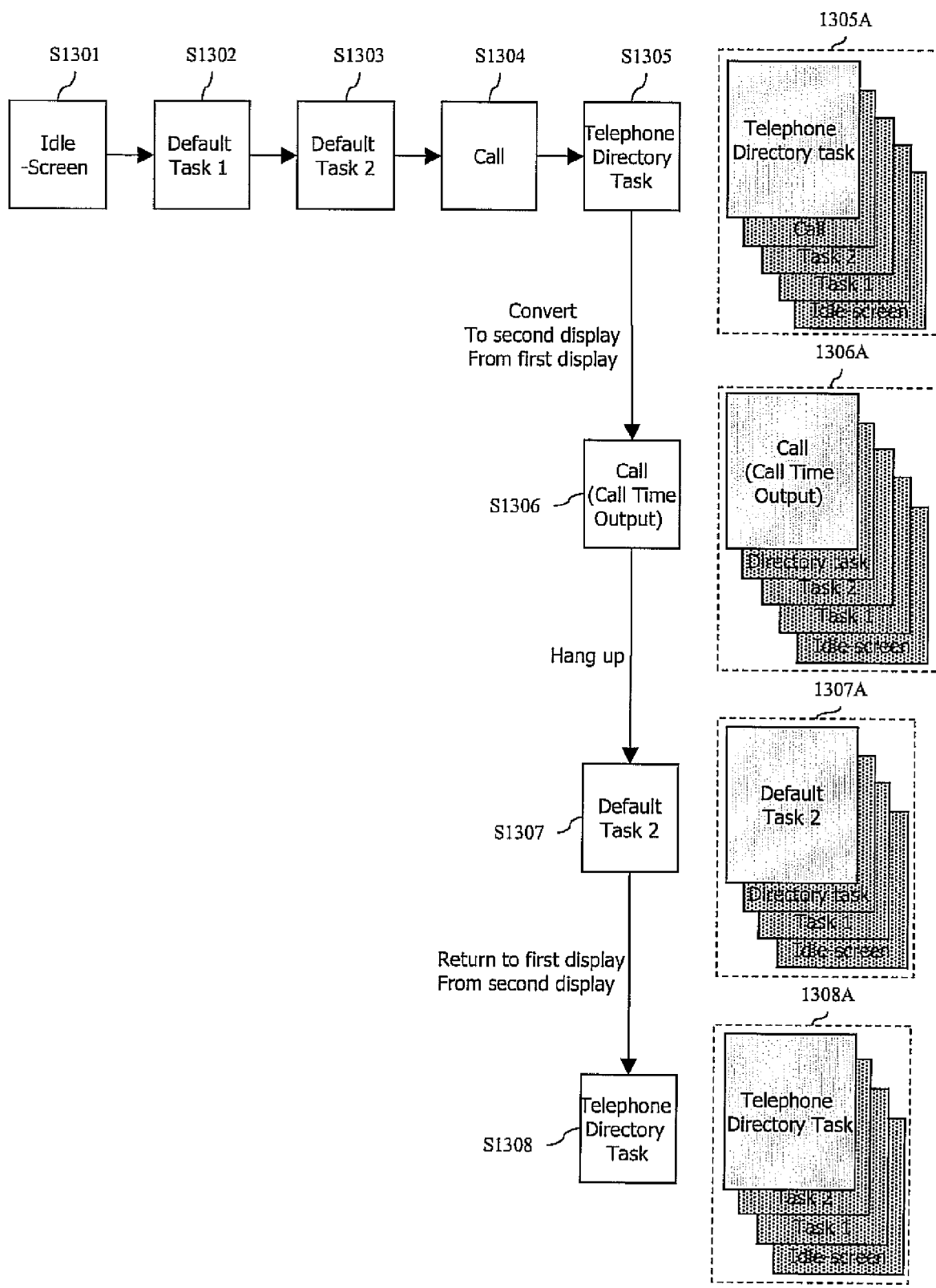
FIG. 13 is an eight exemplary view showing the methods of FIGS. 3 to 5.

FIG. 13 is an eighth exemplary view showing the methods of FIGS. 3 to 5. As shown, an idle-screen is displayed (S1301). Afterward, a default task 1 (S1302) and a default task 2 (S1303) are executed. Then, a call task is requested (S1304) and a telephone directory task is executed (S1305). The task execution order is shown in 1305A. Here, the default tasks have the same priority and the call task is the highest priority task.

During a display conversion from the first display to the second display, the call task is changed into a top layer task because it is the highest priority task. Accordingly, the call task displays information relevant to a call on the second display (S1306). The task execution order is shown in 1306A.

When the call task is finished, although the default tasks 1 and 2 have the same priority, the default task 2 is changed into the top layer task because it is more recently executed than the default task 1. Accordingly, the default task 2 displays a suitable screen on the second display (S1307), as reflected in the task execution order 1307A.

Finally, during a display return from the second display to the first display, the telephone directory task is changed into the top layer task because all remaining tasks are changed to comply with the same execution order as the execution order prior to the display conversion (1308A). Accordingly, the telephone directory task is displayed on the first display (S1308).

Figure 14:
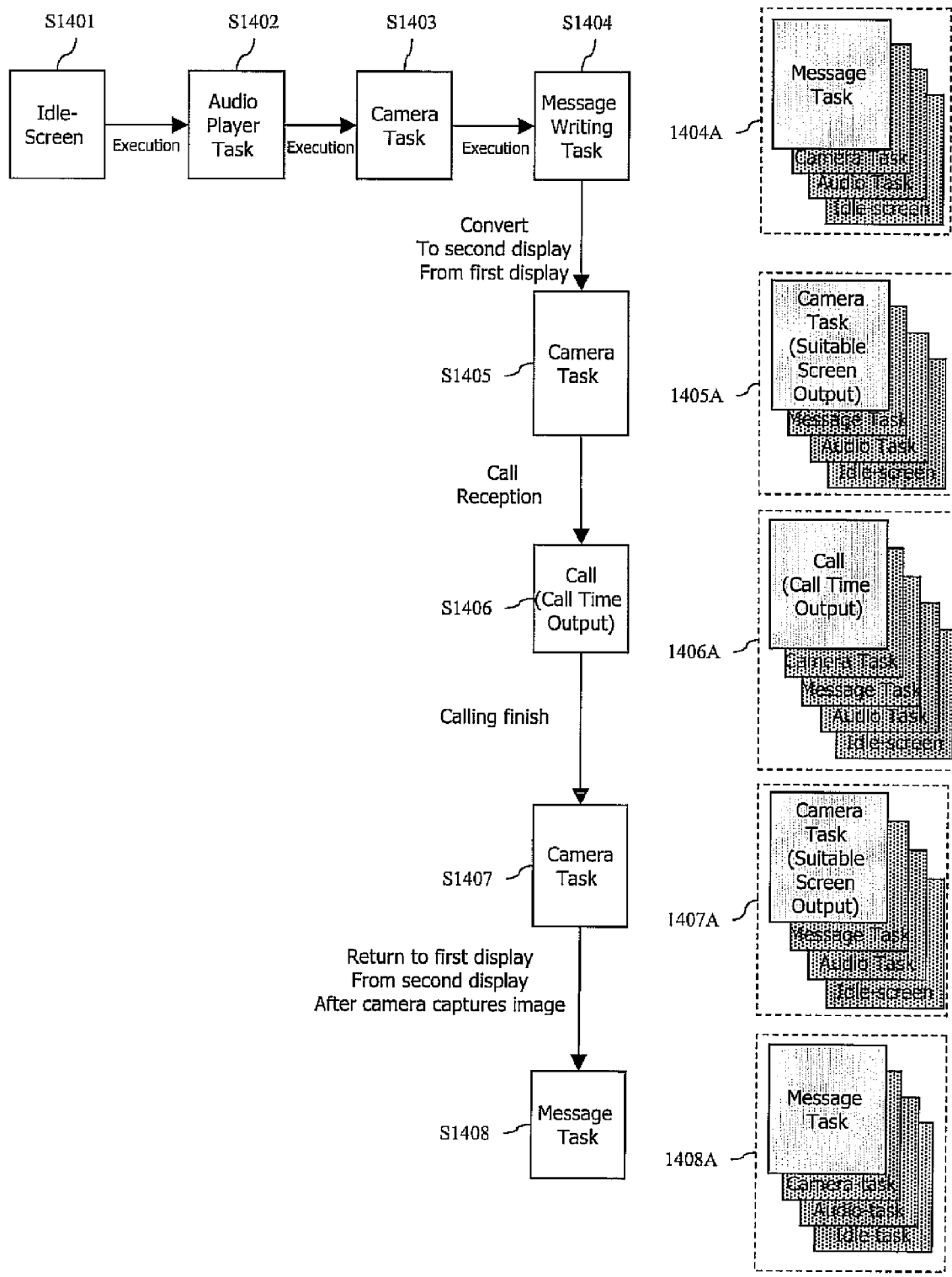
FIG. 14 is a ninth exemplary view showing the methods of FIGS. 3 to 5.

FIG. 14 is a ninth exemplary view showing the methods of FIGS. 3 to 5. As shown, an idle-screen is first displayed (S1401), an audio player task is executed (S1402), and then a camera task is executed (S1403). Afterward, a message writing task is executed (S1404). The task execution order is shown in 1404A. Here, a priority of the message writing task is not set and a priority of the camera task is higher than that of the audio player task.

During a display conversion from the first display to the second display, the camera task is changed into a top layer task because it is the highest priority task among the present tasks. Accordingly, the camera task displays a suitable screen on the second display (S1405), as reflected in the task execution order 1405A.

When a call is received, a suitable screen relevant to the call task is displayed on the second display (S1406). Here, the call task has a higher priority than that of the camera task. This task execution order is shown in 1406A. When the call task is finished, the camera task is re-displayed on the second display (S1407), as reflected in the task execution order 1407A.

Finally, during a display return from the second display to the first display after capturing an image by the camera, the camera task is changed to comply with the same execution order as the execution order prior to the display conversion (1408A). Accordingly, the message writing task is re-displayed on the first display (S1408).

The method for displaying multitasking according to the present invention can be implemented by software, hardware, or a combination of both. For instance, the method can be implemented by codes or commands inside a software program that can be stored in a storage means (e.g., a memory inside a mobile communication terminal, a flash memory, a hard disc, etc.) and can be executed by a processor (e.g., a microprocessor inside a mobile communication terminal).

As aforementioned, in the present invention, a certain screen is displayed on the second display without finishing one or more tasks being executed at the mobile communication terminal during a display conversion from the first display to the second display in a multitasking and multi-display circumstance. Furthermore, during a display return from the second display to the first display, the one or more tasks are executed in the same execution order as the execution order prior to the display conversion. Accordingly, the multitasking is facilitated and a user's convenience is enhanced.

As the recent invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A folder type mobile communication terminal capable of displaying a task executed thereon and configured to be in a folded or open configuration according to a position of a folder of the mobile communication terminal, the mobile communication terminal comprising:

a first display for initially displaying one or more tasks simultaneously being executed on the mobile communication terminal;

a second display for subsequently displaying the one or more tasks simultaneously being executed on the mobile communication terminal responsive to a display conversion from the first display to the second display upon folding of the mobile communication terminal to be in the folded configuration; and a controller operationally connected with the first display and the second display, wherein the controller is configured to display on the second display a highest priority task among the one or more tasks simultaneously being executed responsive to the display conversion, and wherein the controller is further configured to re-display on the first display a task that was displayed on the first display prior to the display conversion responsive to a display return from the second display to the first display upon opening of the mobile communication terminal to be in the open configuration.

2. The mobile communication terminal of claim 1, wherein the highest priority task is a task related to a communication function.

3. The mobile communication terminal of claim 1, wherein the highest priority task is a task related to a sound output function.

4. The mobile communication terminal of claim 1, wherein when the highest priority task is not a Latest Recently Used (LRU) task, the controller changes the highest priority task into an LRU task and displays the changed task on the second display.

5. The mobile communication terminal of claim 1, wherein when the highest priority task does not exist, the controller displays a default task.

6. The mobile communication terminal of claim 1, wherein when the highest priority task is finished executing after the display conversion, the controller displays a next highest priority task among the one more tasks simultaneously being executed.

7. The mobile communication terminal of claim 1, wherein a list of the one or more tasks is displayed on the second display.

8. A method for displaying a task executed on a folder type mobile communication terminal that is configured to be in a folded or open configuration according to a position of a folder of the mobile communication terminal, the method comprising:

initially displaying one or more tasks simultaneously being executed on a first display of the mobile communication terminal;

receiving a command for a display conversion from the first display to a second display of the mobile communication terminal, the command for the display conversion generated when a configuration of the mobile communication terminal is switched from the open configuration into the folded configuration;

subsequently displaying on the second display a highest priority task among the one or more tasks simultaneously being executed in response to the command for the display conversion, and displaying a specific task on the first display in response to a command for a display return from the second display to the first display, the command for the display return generated when the configuration of the mobile communication terminal is switched from the closed configuration into the open configuration, wherein the specific task is a Latest Recently Used (LRU) task that was displayed on the first display prior to the display conversion.

wherein the one or more tasks have the same execution order as an execution order prior to the display conversion upon the display return.

9. The method of claim 8, further comprising:

comparing priorities of the one or more tasks with each other when receiving the command for the display conversion; and determining the highest priority task based on the comparison.

10. The method of claim 8, wherein the highest priority task is a task related to a communication function.

11. The method of claim 8, wherein the highest priority task is a task related to a sound output function.

12. The method of claim 8, further comprising:

changing the highest priority task into the Latest Recently Used (LRU) task if the highest priority task is not the LRU task.

13. The method of claim 8, wherein a default task is displayed if the highest priority task does not exist.

14. The method of claim 8, further comprising:

finishing the highest priority task and displaying a next highest priority task on the second display if a command to finish the highest priority task is received after the displaying on the second display the highest priority task.

15. The method of claim 8, further comprising:

displaying a list of the one or more tasks on the second display.

16. The mobile communication terminal of claim 1, wherein only one of the first display and the second display is active according to the folded or open configuration.

17. The mobile communication terminal of claim 16, wherein the first display is active in the open configuration.

18. The mobile communication terminal of claim 16, wherein the second display is active in the folded configuration.

19. The method of claim 8, wherein only one of the first display and the second display is active according to the folded or open configuration.

20. The method of claim 19, wherein the first display is active in the open configuration.

21. The method of claim 19, wherein the second display is active in the folded configuration.

* * * * *